(12) United States Patent
Wang

(10) Patent No.: US 10,947,710 B2
(45) Date of Patent: Mar. 16, 2021

(54) FAUCET

(71) Applicant: Chun-Ping Wang, Taipei (TW)

(72) Inventor: Chun-Ping Wang, Taipei (TW)

( * ) Notice: Subject to any disclaimer, the term of this patent is extended or adjusted under 35 U.S.C. 154(b) by 0 days.

(21) Appl. No.: 16/114,302

(22) Filed: Aug. 28, 2018

(65) Prior Publication Data

US 2019/0063049 A1 Feb. 28, 2019

(30) Foreign Application Priority Data

Aug. 29, 2017 (TW) .................. 106129406
Jun. 29, 2018 (TW) .................. 107122692

(51) Int. Cl.
*E03C 1/05* (2006.01)
*F16K 31/06* (2006.01)
*F16K 37/00* (2006.01)
*E03C 1/04* (2006.01)

(52) U.S. Cl.
CPC .............. *E03C 1/057* (2013.01); *F16K 31/06* (2013.01); *F16K 37/0033* (2013.01); *E03C 2001/0415* (2013.01)

(58) Field of Classification Search
CPC ......... E03C 1/0404; E03C 1/055; E03C 1/057
USPC .......................................... 137/625.4–625.41
See application file for complete search history.

(56) References Cited

U.S. PATENT DOCUMENTS

| 4,762,273 | A | * | 8/1988 | Gregory | .................. | E03C 1/057 |
| | | | | | | 137/801 |
| 8,091,856 | B2 | | 1/2012 | Maercovich et al. | | |
| 8,572,772 | B2 | * | 11/2013 | Wolf | ........................ | E03C 1/057 |
| | | | | | | 4/623 |
| 9,243,756 | B2 | * | 1/2016 | Davidson | .................. | F17D 3/00 |
| 9,637,895 | B2 | * | 5/2017 | Song | ........................ | E03C 1/057 |
| 9,976,291 | B2 | * | 5/2018 | Sawaski | .................. | E03C 1/055 |
| 2008/0072969 | A1 | | 3/2008 | Maercovich | | |
| 2011/0011473 | A1 | * | 1/2011 | Lang | ........................ | E03C 1/055 |
| | | | | | | 137/625.41 |
| 2014/0000733 | A1 | * | 1/2014 | Jonte | ........................ | E03C 1/05 |
| | | | | | | 137/552 |
| 2015/0101121 | A1 | * | 4/2015 | Burgo, Sr. | ............ | E03C 1/0404 |
| | | | | | | 4/668 |

(Continued)

FOREIGN PATENT DOCUMENTS

CN 103363177 A 10/2013
CN 103711979 A 4/2014

(Continued)

OTHER PUBLICATIONS

Office Action issued in corresponding Taiwan patent application dated Dec. 12, 2018.

(Continued)

*Primary Examiner* — David P Angwin
*Assistant Examiner* — Nicholas A Ros
(74) *Attorney, Agent, or Firm* — McClure, Qualey & Rodack, LLP

(57) ABSTRACT

A faucet is provided, and the faucet includes a faucet body, an electrically controllable valve, a contact sensing unit or a proximity sensing unit, a motion sensing unit, and a control unit. The control unit determines an operation mode of the faucet based on a signal of the contact sensing unit or the proximity sensing unit, and a signal of the motion sensing unit, and controls an on-off state of the electrically controllable valve.

4 Claims, 12 Drawing Sheets

(56) References Cited

U.S. PATENT DOCUMENTS

2018/0313069 A1\* 11/2018 Cipriani ................. E03C 1/055
2019/0368172 A1\* 12/2019 Chung ................ F16L 27/0804

FOREIGN PATENT DOCUMENTS

| CN | 203656257 U | 6/2014 |
|----|-------------|--------|
| CN | 103363177 B | 9/2015 |
| CN | 103711979 B | 7/2016 |
| TW | 570418 U | 1/2004 |
| TW | M338383 U | 8/2008 |
| TW | M419004 U | 12/2011 |

OTHER PUBLICATIONS

Chinese language Office Action dated Dec. 12, 2018, issued in application No. TW 107122692 (with translation).
Chinese language Notice of Allowance dated Jun. 19, 2019, issued in application No. TW 107122692 (with translation).

\* cited by examiner

FAUCET

CROSS-REFERENCES TO RELATED APPLICATIONS

This non-provisional application claims priority under 35 U.S.C. § 119(a) to Patent Application No. 106129406 and 107122692, filed in Taiwan, R.O.C. on Aug. 29, 2017 and Jun. 29, 2018, the entire contents of which are hereby incorporated by reference.

BACKGROUND

Technical Field

The present invention relates to a faucet, and in particular, to a faucet that determines an operation mode or an on-off state based on signals of a plurality of sensing units.

Related Art

Faucets are common water supply devices in contemporary life for users to clean items or hands. However, when hands are dirty and needed to be washed, a switch of a faucet has to be manually turned on and thus gets polluted, and a user needs to clean the switch of the faucet after cleaning the hands, which consumes additional resources.

SUMMARY

In view of this, embodiments of the present invention provide a faucet easy to operate.

An embodiment of the present invention provides a faucet, and the faucet includes a faucet body, an electrically controllable valve, a contact sensing unit, a motion sensing unit, and a control unit. The faucet body includes a water inlet end and a water outlet end. The electrically controllable valve is connected between the water inlet end and the water outlet end, to allow or block the connection between the water inlet end and the water outlet end based on an on-off state of the electrically controllable valve. The contact sensing unit includes a sensing end, where the sensing end is disposed on or electrically connected to the faucet body, to respond, based on whether the faucet body is contacted by an object, a change of a first signal output from the contact sensing unit. The motion sensing unit includes a movable part, where the movable part is disposed on the faucet body, to respond, based on a motion of a part of the faucet body, a change of a second signal output from the motion sensing unit. The control unit is electrically connected to the contact sensing unit, the motion sensing unit, and the electrically controllable valve, to control the on-off state of the electrically controllable valve based on the first signal and the second signal.

An embodiment of the present invention further provides a faucet, and the faucet includes a faucet body, an electrically controllable valve, and a power module. The faucet body includes a water inlet end and a water outlet end. The electrically controllable valve is connected between the water inlet end and the water outlet end, to allow or block connection between the water inlet end and the water outlet end based on an on-off state of the electrically controllable valve. The power module includes two power supply units electrically connected to the electrically controllable valve. One of the two power supply units is selectively used to supply power.

An embodiment of the present invention further provides a faucet, and the faucet includes a faucet body, an electrically controllable valve, a motion sensing unit, and a control unit. The faucet body includes a water inlet end and a rotatable water outlet pipe, where the water outlet pipe has a water outlet end. The electrically controllable valve is connected between the water inlet end and the water outlet end, to allow or block connection between the water inlet end and the water outlet end based on an on-off state of the electrically controllable valve. The motion sensing unit includes a movable part, where the movable part is disposed on the faucet body, to respond, based on rotation of the water outlet pipe, a change of a signal output from the motion sensing unit. The control unit is electrically connected to the motion sensing unit and the electrically controllable valve, to get a rotation status of the water outlet pipe based on the signal output from the motion sensing unit.

An embodiment of the present invention further provides a faucet, and the faucet includes a faucet body, an electrically controllable valve, a proximity sensing unit, a motion sensing unit, and a control unit. The faucet body includes a water inlet end and a water outlet end. The electrically controllable valve is connected between the water inlet end and the water outlet end, to allow or block the connection between the water inlet end and the water outlet end based on an on-off state of the electrically controllable valve. The proximity sensing unit has a detection zone outside the faucet body, to respond, based on whether an object enters the detection zone, a change of a third signal output from the proximity sensing unit. The motion sensing unit includes a movable part, where the movable part is disposed on the faucet body, to respond, based on a motion of a part of the faucet body, a change of a second signal output from the motion sensing unit. The control unit is electrically connected to the proximity sensing unit, the motion sensing unit, and the electrically controllable valve, to control the on-off state of the electrically controllable valve based on the third signal and the second signal.

In conclusion, a contact sensing unit or a proximity sensing unit and a motion sensing unit may be installed on a faucet in an embodiment of the present invention, so that the faucet executes a plurality of modes based on a detection signal of the faucet. In addition, a faucet in an embodiment of the present invention may be used as an input interface through rotation of a water outlet pipe. Furthermore, a power module of a faucet in an embodiment of the present invention has a plurality of power supply units, so that it can be ensured that at least some elements in the faucet are normally operated. Moreover, a faucet in an embodiment of the present invention further has an indication unit that may be used by a user to identify a status of the faucet.

BRIEF DESCRIPTION OF THE DRAWINGS

The present invention will become more fully understood from the detailed description given herein below for illustration only, and thus are not limitative of the present invention, and where.

DETAILED DESCRIPTION

Figure 1:
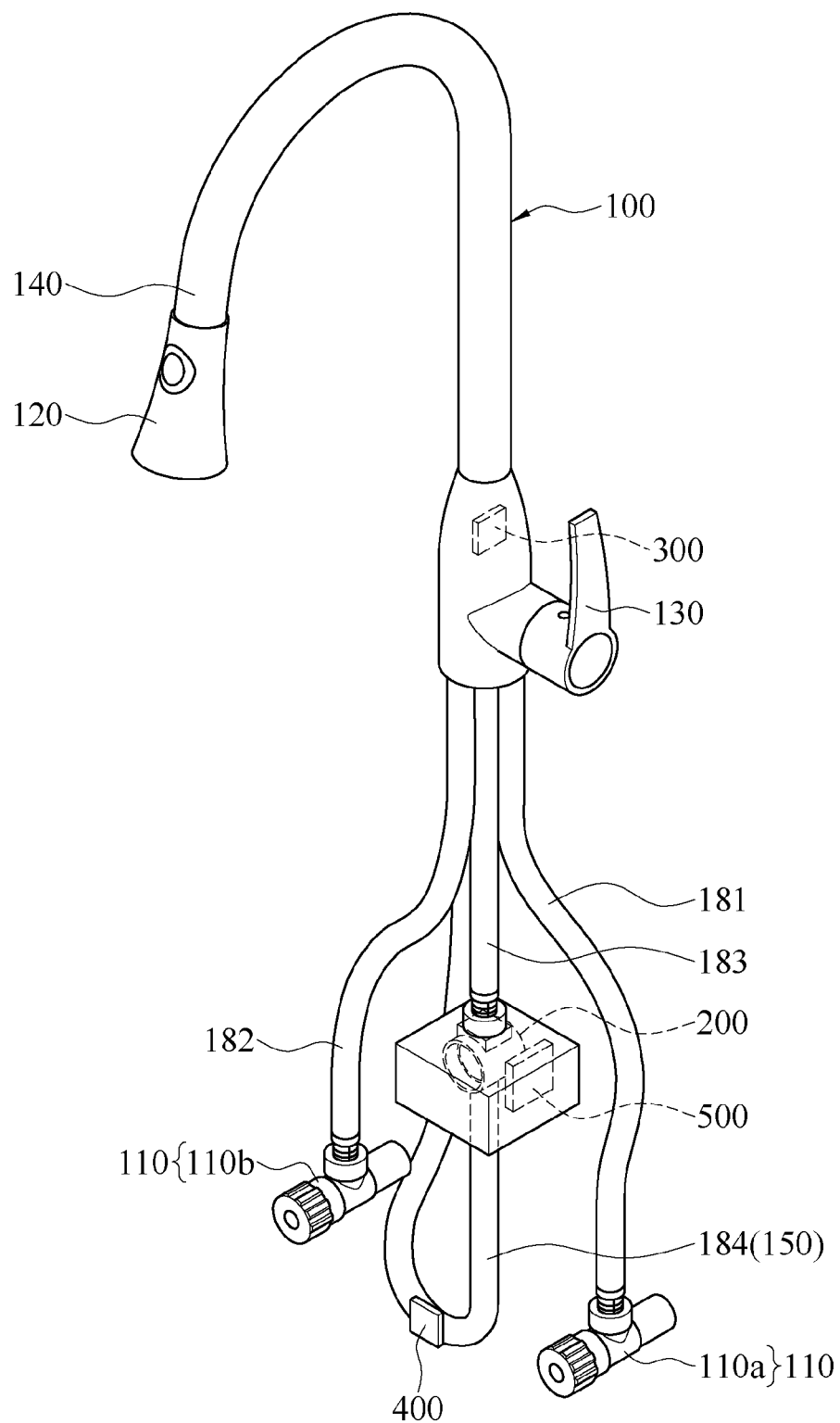
FIG. 1 is a schematic three-dimensional diagram 1 of a faucet according to an embodiment of the present invention.
Figure 2:
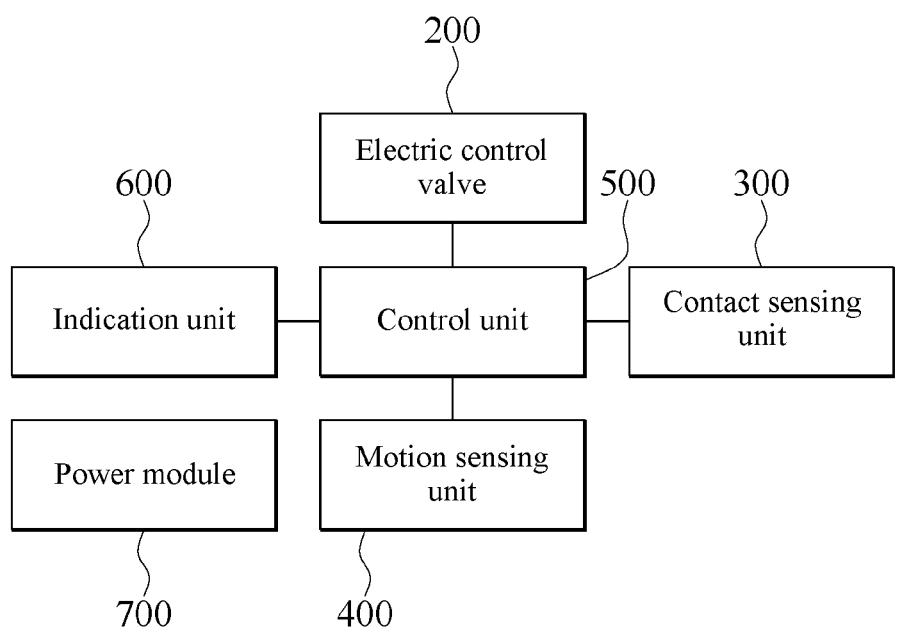
FIG. 2 is a schematic block diagram of a faucet according to an embodiment of the present invention.

Referring to FIG. 1 and FIG. 2, which are respectively a schematic three-dimensional diagram and a schematic block diagram of a faucet according to an embodiment of the present invention. The faucet includes a faucet body 100, an electrically controllable valve 200, a contact sensing unit 300, a motion sensing unit 400, a control unit 500, and a power module 700. The control unit 500 is electrically connected to (for example, electrically connected to by using a conductive wire) the electrically controllable valve 200, the contact sensing unit 300, and the motion sensing unit 400. The control unit 500 may be a single chip, a microprocessor, an embedded controller, another circuit that can perform logical operation, or the like. The electrically controllable valve 200 may be, for example, a solenoid valve or any other kind of electrically controllable valve. The power module 700 supplies power to the power-consuming element in the faucet, for example, the electrically controllable valve 200, the contact sensing unit 300, the motion sensing unit 400, and the control unit 500. The power module 700 may convert external sources into an appropriate power supply manner, to supply the power-consuming elements with power, for example, a power supplier, a voltage regulator, a solar panel, or a port. Alternatively, the power module 700 may have sources itself that may supply the power-consuming elements with power, for example, a battery, a capacitor, or a generator.

In this embodiment, the faucet body 100 includes a water inlet end 110, a water outlet end 120, a manual control valve 130, and a water outlet pipe 140. The manual control valve 130 is located between the water inlet end 110 and the water outlet end 120, and the water outlet pipe 140 is located between the water outlet end 120 and the manual control valve 130. In a manual mode (that is, a mode in which the faucet needs to be turned on or turned off by using the manual control valve 130), the control unit 500 keeps the electrically controllable valve 200 turned on, and may allow or block connection between the water inlet end 110 and the water outlet end 120 based on an on-off state of the manual control valve 130.

In this embodiment, the faucet body 100 has two water inlet ends 110, namely, a cold water inlet end 110a and a hot water inlet end 110b, but the present invention is not limited thereto. Alternatively, the faucet body 100 may have only one water inlet end 110, or may have a larger quantity of water inlet ends 110. The faucet body 100 may further include a plurality of connection pipes 181 to 184. The connection pipe 181 is connected between the cold water inlet end 110a and the manual control valve 130; the connection pipe 182 is connected between the hot water inlet end 110b and the manual control valve 130; the connection pipe 183 is connected between the manual control valve 130 and the electrically controllable valve 200; and the connection pipe 184 is connected between the electrically controllable valve 200 and the water outlet end 120. In this embodiment, the manual control valve 130 has a mixed space internally, to mix cold water flowing through the connection pipe 181 with hot water flowing through the connection pipe 182, and then the mixed water flows out from the water outlet end 120 through the connection pipe 183, the electrically controllable valve 200, and the connection pipe 184 in sequence. In addition to controlling the on-off state, the manual control valve 130 may further control a volume ratio of cold water to hot water and an overall water volume, but this embodiment of the present invention is not limited thereto.

In this embodiment, at least a part of the connection pipe 184 is located in the water outlet pipe 140. In some embodiments (such as an embodiment shown in FIG. 4), the connection pipe 184 is connected to the water outlet pipe 140.

Herein, the electrically controllable valve 200 is connected between the manual control valve 130 and the water outlet end 120. In a touch mode, the manual control valve 130 is in an on state, and the connection between the water inlet end 110 and the water outlet end 120 may be allowed or blocked based on the on-off state of the electrically controllable valve 200, so that the faucet is turned on (draining water) or turned off (not draining water). In some embodiments, the electrically controllable valve 200 may also be connected between the manual control valve 130 and the water inlet end 110, and a corresponding quantity of the electrically controllable valves 200 are configured according to a quantity of the water inlet ends 110, to control whether there is water flow through each water inlet end 110.

Figure 3:
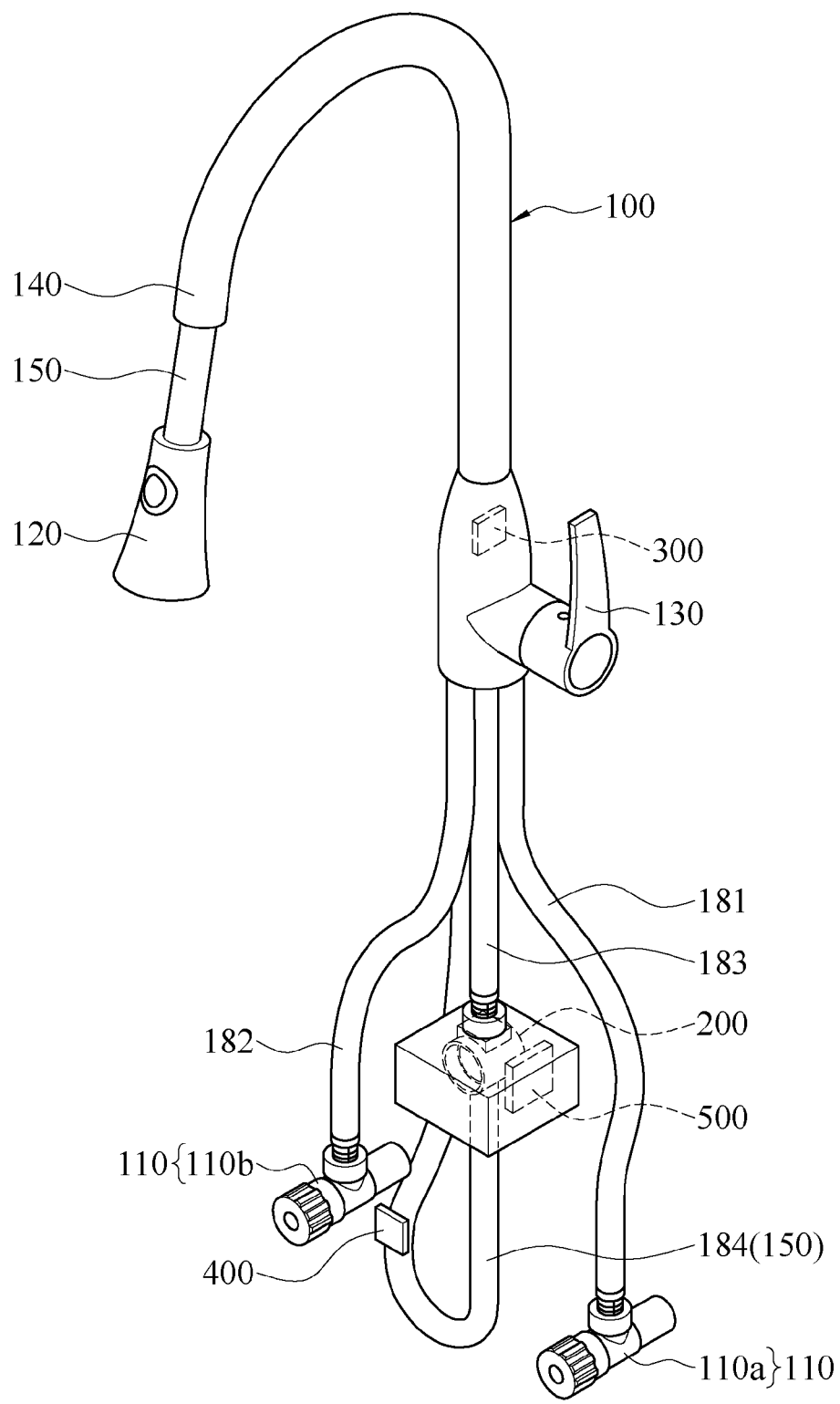
FIG. 3 is a schematic three-dimensional diagram 2 of a faucet according to an embodiment of the present invention.

The contact sensing unit 300 has a sensing end. The sensing end of the contact sensing unit 300 is disposed on or electrically connected to at least a part of an outer surface of the faucet body 100, to respond, based on whether the part is contacted by an object (for example, a human body), a change of a signal (referred to as a first signal herein) output from the contact sensing unit 300. Referring to FIG. 1 and FIG. 3 together, herein, the whole contact sensing unit 300 is disposed on the faucet body 100, but this embodiment of the present invention is not limited thereto, provided that the sensing end of the contact sensing unit 300 is disposed on or electrically connected to the at least a part of the outer surface of the faucet body 100. The contact sensing unit 300 may sense the object through capacitance sensing, resistance sensing, piezoelectric sensing, and the like, and can respond with different signals based on whether the faucet body 100 is contacted by the object, but this embodiment of the present invention is not limited thereto. For example, when the object does not contact the faucet body 100, the first signal is at a first level (for example, a high level); when the object contacts the faucet body 100, the first signal is at a second level (for example, a low level); and when the object moves away from the faucet body 100, the first signal is at the first level again. Therefore, through the changes of the first signal, a period in which the object contacts the faucet body 100 can be got.

In some embodiments, the contact sensing unit 300 is a capacitance sensing unit, including a capacitor and a capacitance detection circuit, the capacitor is electrically connected to the capacitance detection circuit, and an end at which the capacitor is connected to the capacitance detection circuit is the foregoing sensing end. The capacitance detection circuit may detect, by using but not limited to, an RC oscillation frequency, a capacitance value of an equivalent capacitor of the sensing end or a change of the capacitance value. When the object contacts the at least a part of the outer surface of the faucet body 100 which the sensing end of the contact sensing unit 300 is disposed on or electrically connected to, the equivalent capacitance value changes. Therefore, by detecting the equivalent capacitance value of the sensing end or the change of the equivalent capacitance value, whether the at least a part of the outer surface of the faucet body 100 is contacted by the object can be inferred.

In some embodiments, the contact sensing unit 300 is a resistance sensing unit, including a resistor whose resistance value is varied with the deformation of the resistor caused by external force and a resistance detection circuit. The resistor is electrically connected to the resistance detection circuit, and the resistor is the foregoing sensing end. The resistance detection circuit may detect a change of the resistance value of the resistor based on whether the at least a part that is of the outer surface of the faucet body 100 and on which the sensing end is disposed is contacted by the object. Therefore, based on the detected resistance value, whether the at least a part of the outer surface of the faucet body 100 is contacted by the object can be inferred.

In some embodiments, the contact sensing unit 300 is a piezoelectric sensing unit, including a piezoelectric element and a voltage detection circuit. The piezoelectric element is electrically connected to the voltage detection circuit, and the piezoelectric element is the foregoing sensing end. When an external force is applied to a forced surface of the piezoelectric element, a corresponding voltage is generated on a surface opposite to the forced surface of the piezoelectric element. The voltage detection circuit may detect a voltage value of the surface opposite to the forced surface of the piezoelectric element or a change of the voltage value. When the object contacts the at least a part of the outer surface of the faucet body 100 which the sensing end of the contact sensing unit 300 is disposed on, the voltage value changes because of a contact pressure. Therefore, by detecting the voltage value of the sensing end or the change of the voltage value of the sensing end, whether the at least a part of the outer surface of the faucet body 100 is contacted by the object can be inferred.

In some embodiments, the part used to sense a contact may be located in the manual control valve 130 of the faucet body, the water outlet pipe 140, or/and another part, provided that the sensing end of the contact sensing unit 300 is disposed on or electrically connected to the manual control valve 130 of the faucet body, the water outlet pipe 140, or/and another part that can be contacted by a user. A quantity of the contact sensing unit 300 is not limited to one. For example, the parts that may be used in detecting the object contact may be respectively connected to the sensing end of different contact sensing unit 300. For example, if the manual control valve 130 is separated from the water outlet pipe 140, the manual control valve 130 and the water outlet pipe may be respectively electrically connected to the sensing end of different contact sensing unit 300, and the control unit 500 determines, based on a first signal output from each contact sensing unit 300, whether the manual control valve 130 or the water outlet pipe 140 is contacted by an object.

The motion sensing unit 400 includes a movable part. The movable part is used for sensing motion, for example, sensing a motion such as a displacement or a rotation. The movable part of the motion sensing unit 400 is disposed on the faucet body 100, to respond, based on a motion of a part of the faucet body 100, a change of a signal (referred to as a second signal herein) output from the motion sensing unit. Herein, the connection pipe 184 may be a pulling water pipe 150 that can be pulled out from the water outlet end 120 of the faucet body 100. As shown in FIG. 3, FIG. 3 is a schematic diagram of a pulled-out state of the pulling water pipe 150. Referring to FIG. 1 and FIG. 3 together, herein, the whole motion sensing unit 400 is disposed on the pulling water pipe 150, but this embodiment of the present invention is not limited thereto, provided that the movable part of the motion sensing unit 400 is disposed on the pulling water pipe 150. The movable part of the motion sensing unit 400 has a displacement when the pulling water pipe 150 is pulled or released, and therefore the change of the second signal may reflect a motion change of the pulling water pipe 150. Herein, a position on the pulling water pipe 150 at which the motion sensing unit 400 is disposed shown in FIG. 1 is merely an example, and this embodiment of the present invention is not limited thereto. For example, the movable part of the motion sensing unit 400 may be disposed at a position on the water outlet pipe 140. In addition, a quantity of the motion sensing unit 400 is not limited to one. The motion sensing unit 400 may be a multi-axial accelerometer that can detect acceleration changes in different axial directions, but the present invention is not limited thereto. A displacement status of the pulling water pipe 150 may be calculated based on the acceleration changes.

The control unit 500 may control an operation mode of the faucet based on the first signal. Herein, the operation mode may be the manual mode or the touch mode. The manual mode is used by the user to operate the manual control valve 130, and when the manual control valve 130 is turned on, the faucet is turned on, and when the manual control valve 130 is turned off, the faucet is turned off. The touch mode is used by the user to determine, based on an action of contacting the faucet body 100, whether to turn on or turn off the faucet. This is described in detail hereinafter. When the control unit 500 detects that a time period in which the first signal changes from a first level to a second level and keeps in the second level longer than a first time period, it indicates that the faucet body 100 is contacted by an object for a period of time, and it indicates that the user intends to change the operation mode of the faucet. Therefore, the control unit 500 changes the operation mode of the faucet from the current manual mode to the touch mode or from the current touch mode to the manual mode.

Figure 4:
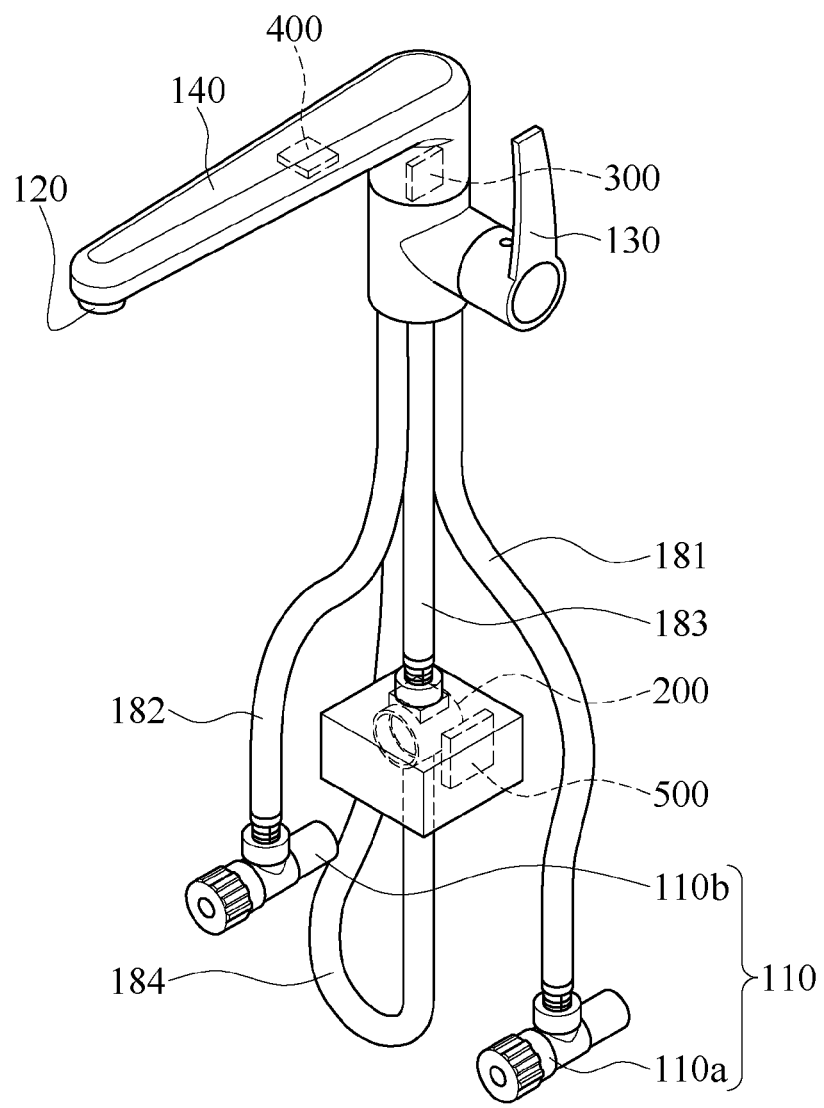
FIG. 4 is a schematic three-dimensional diagram of a faucet according to another embodiment of the present invention.

In some embodiments, the water outlet pipe 140 is rotatable, as shown in FIG. 4. The motion sensing unit 400 may be disposed on the water outlet pipe 140. The user pushes the water outlet pipe 140 and the water outlet end 120 can rotate relative to an axial center, to change a water flow position. However, when the user pushes the water outlet pipe 140, a surface of the water outlet pipe 140 is usually contacted, as a result, the control unit 500 may perform an erroneous determining in the touch mode to perform the foregoing action of turning on or turning off the faucet. Therefore, the motion sensing unit 400 may be used to help determine whether the action of contacting the faucet body indicates that the user wants to push the water outlet pipe 140. A specific detection manner is that a horizontal motion quantity (referred to as a first horizontal motion quantity hereinafter) of the water outlet pipe 140 may be obtained by using the second signal output from the motion sensing unit 400. In the touch mode, when the control unit 500 detects that the faucet body 100 is contacted by the object (that is, the first signal changes from the first level to the second level) and the first horizontal motion quantity is less than a first threshold, it is determined that the user intends to turn on or turn off the faucet through contact, and therefore the on-off state of the electrically controllable valve 200 changes. When the control unit 500 detects that the faucet body 100 is contacted by the object (that is, the first signal changes from the first level to the second level) and the first horizontal motion quantity is greater than a first threshold, it is determined that the user intends to push the water outlet pipe 140 instead of turning on or turning off the faucet, and therefore the on-off state of the electrically controllable valve 200 does not change.

The motion quantity may be a displacement, a velocity or an acceleration according to different statuses in different embodiments.

Still referring to FIG. 1 and FIG. 3, in some embodiments, the motion sensing unit 400 is disposed on the pulling water pipe 150, and a vertical motion quantity of the pulling water pipe 150 may be detected. Herein, a motion quantity is described by using a displacement as an example, and it may be set that when the pulling water pipe 150 is not pulled out, the vertical motion quantity is an initial value, and the initial value may be, for example, zero. When detecting that the vertical motion quantity is greater than a second threshold, the control unit 500 determines that the pulling water pipe 150 is in a pulled-out state, and further turns on the electrically controllable valve 200, so that the faucet is turned on. On the contrary, when detecting that the vertical motion quantity is less than another second threshold, the control unit 500 determines that the pulling water pipe 150 is in a released state, and further turns off the electrically controllable valve 200, so that the faucet is turned off. Herein, the two second threshold may be either the same or different. Therefore, the user may directly use the faucet by pulling or releasing the pulling water pipe 150 instead of turning on the faucet in the manual mode or the touch mode. This is herein referred to as a pull-down outlet mode. However, the faucet having the pulling water pipe 150 is not limited to must have a pull-down outlet mode in this embodiment of the present invention. The faucet having the pulling water pipe 150 may still be turned on or turned off in the manual mode or the touch mode (herein referred to as a non-pull-down outlet mode).

In some embodiments, when the water outlet pipe 140 rotates, the motion sensing unit 400 disposed on the pulling water pipe 150 also rotates, and therefore a horizontal motion quantity (which herein may be referred to as a second horizontal motion quantity) of the pulling water pipe 150 may be detected, and it may be determined whether the second horizontal motion quantity is greater than a third threshold. Herein, based on the position on the pulling water pipe 150 at which the motion sensing unit 400 is disposed, third thresholds of different values may be set. For example, if the motion sensing unit 400 is disposed at a position in a rotatable water outlet pipe 140, because a relatively large second horizontal motion quantity of the pulling water pipe 150 is generated due to the rotation of the water outlet pipe 140, a relatively large third threshold may be set. If the motion sensing unit 400 is not disposed at a position in a rotatable water outlet pipe 140, when the water outlet pipe 140 rotates, the pulling water pipe 150 may still rotate with the water outlet pipe 140, so that a relatively small second horizontal motion quantity is generated, and a relatively small third threshold may be set, to determine whether the pulling water pipe 150 is rotated. However, the foregoing is merely an example, and this embodiment of the present invention is not limited thereto. For example, an inverse case may occur due to that the water outlet pipe 140 and the pulling water pipe 150 have structures different from those of the foregoing examples. Therefore, a relationship between the position on the pulling water pipe 150 at which the motion sensing unit 400 is disposed and the value of the third threshold is not limited in this embodiment of the present invention, provided that whether the pulling water pipe 150 is rotated can be determined by using the third threshold and the detected second horizontal motion quantity. That is, when detecting that the faucet body 100 is contacted by the object and the second horizontal motion quantity is less than the third threshold, the control unit 500 changes the on-off state of the electrically controllable valve 200, or when detecting that the faucet body 100 is contacted by the object and the second horizontal motion quantity is greater than the third threshold, the control unit 500 does not change the on-off state of the electrically controllable valve 200. By the way, in this example, if the control unit 500 does not detect that the faucet body 100 is contacted by the object, the control unit 500 does not change the on-off state of the electrically controllable valve 200.

In some embodiments, a rotation direction and a rotation angle of the water outlet pipe 140 (or the pulling water pipe 150) may further be got through a vector variation of the foregoing first horizontal motion quantity (or the second horizontal motion quantity).

In some embodiments, the motion sensing unit 400 may further be a gyroscope, and whether the outlet pipe 140 rotates or pulling water pipe 150 rotates as the water outlet pipe 140 rotates may be determined by using a triaxial velocity signal measured by the gyroscope. In addition, whether the pulling water pipe 150 is pulled or released may be detected. In some embodiments, the rotation direction and rotation angle of the water outlet pipe 140 or the pulling water pipe 150 may further be got through directivity of the triaxial velocity signal.

Figure 5:
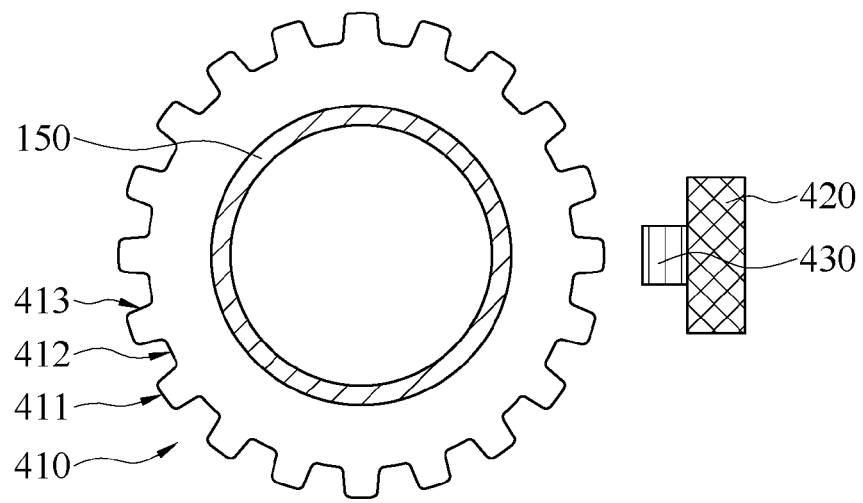
FIG. 5 to FIG. 12 are schematic diagrams of configuration of a motion sensing unit according to some embodiments of the present invention.

In an embodiment, as shown in FIG. 5, the motion sensing unit 400 may be a magnetoresistive sensor including a gear plate 410, a magnet 420, a magnetoresistive element 430, and a resistance detection circuit (not shown). The gear plate 410 is made of magnetic material such as iron, and a tooth flank 413 of the gear plate 410 has convex teeth 411 and concave teeth 412 that are interlaced, and is sleeved on the pulling water pipe 150. Herein, the gear plate 410 is the foregoing movable part. The magnet 420 is located on one side of the tooth flank 413 of the gear plate 410, and the magnetoresistive element 430 is located between the gear plate 410 and the magnet 420. When the pulling water pipe 150 rotates, the gear plate 410 rotates, and a distance between the tooth flank 413 and the magnet 420 changes, so that a magnetic field that is between the magnet 420 and the gear plate 410 and in which the magnetoresistive element 430 is located changes. Therefore, a resistance value of the magnetoresistive element 430 changes due to the change of the magnetic field. The resistance detection circuit is connected to the magnetoresistive element 430, to detect the resistance value of the magnetoresistive element 430, so that whether the pulling water pipe 150 rotates because of the rotation of the water outlet pipe 140 may be determined based on the change of the resistance value of the magnetoresistive element 430. In addition, when the pulling water pipe 150 is pulled, the gear plate 410 is not opposite to the magnet 420. In this case, the magnetoresistive element 430 senses a magnetic field different from that when the gear plate 410 is opposite to the magnet 420. Therefore, whether the pulling water pipe 150 is pulled or released may also be determined based on the change of the resistance value of the magnetoresistive element 430. Herein, though a distance between the convex tooth 411 and the concave tooth 412 that are interlaced on tooth flank 413 is fixed, in some embodiments, the distance between the convex tooth 411 and the concave tooth 412 may not be fixed and may be designed to be a combination of specific distances, so that when the gear plate 410 rotates clockwise or counterclockwise, changing processes of the resistance value of the magnetoresistive element 430 are different. In this way, the rotation direction and angle of the water outlet pipe 140 may be identified.

Figure 6:
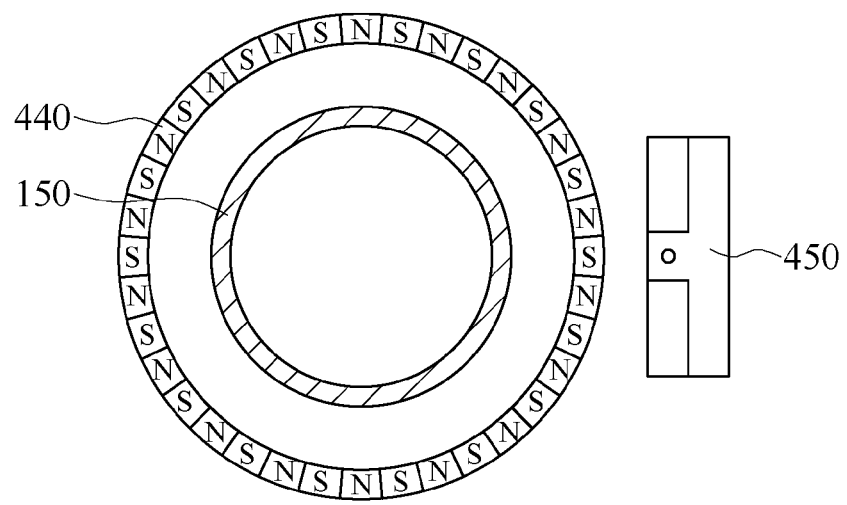

In an embodiment, as shown in FIG. 6, the motion sensing unit 400 may be a Hall sensor including a magnetic disk 440, a Hall element 450, and a voltage detection circuit (not shown). The magnetic disk 440 has a round shape, and a side edge of the magnetic disk 440 has north and south magnetic poles that are interlaced, and is sleeved on the pulling water pipe 150. Herein, the magnetic disk 440 is the foregoing movable part. The Hall element 450 is located on one side of the magnetic disk 440. When the pulling water pipe 150 rotates, the magnetic disk 440 rotates, so that the Hall element 450 senses a change of a magnetic field of the magnetic disk 440. Therefore, the Hall element 450 changes, due to the change of the magnetic field, a voltage output from the Hall element 450. The voltage detection circuit is connected to the Hall element 450, to detect the voltage value of the Hall element 450, so that whether the pulling water pipe 150 rotates because of the rotation of the water outlet pipe 140 may be determined based on the change of the voltage value output from the Hall element 450. In addition, when the pulling water pipe 150 is pulled, the magnetic disk 440 is no longer opposite to the Hall element 450, so that the Hall element 450 cannot sense a magnetic field or senses only a weak magnetic field. Therefore, whether the pulling water pipe 150 is pulled or released may also be determined based on the change of the voltage value of the Hall element 450. Herein, although a distance between a north magnetic pole and a south magnetic pole that are interlaced on the magnetic disk 440 is fixed, in some embodiments, the distance between the north magnetic pole and the south magnetic pole may not be fixed and may be designed to be a combination of specific distances, so that when the magnetic disk 440 rotates clockwise or counterclockwise, the changing processes of the magnetic field of the magnetic disk 440 sensed by the Hall element 450 are different. In this way, the rotation direction and angle of the water outlet pipe 140 may be identified.

In some embodiments, according to the embodiments in FIG. 5 and FIG. 6, in addition to detecting the rotation of the water outlet pipe 140 based on the change of magnetic field strength, the rotation angle of the water outlet pipe 140 may further be inferred through the times of the change of the sensed magnetic field.

Figure 7:
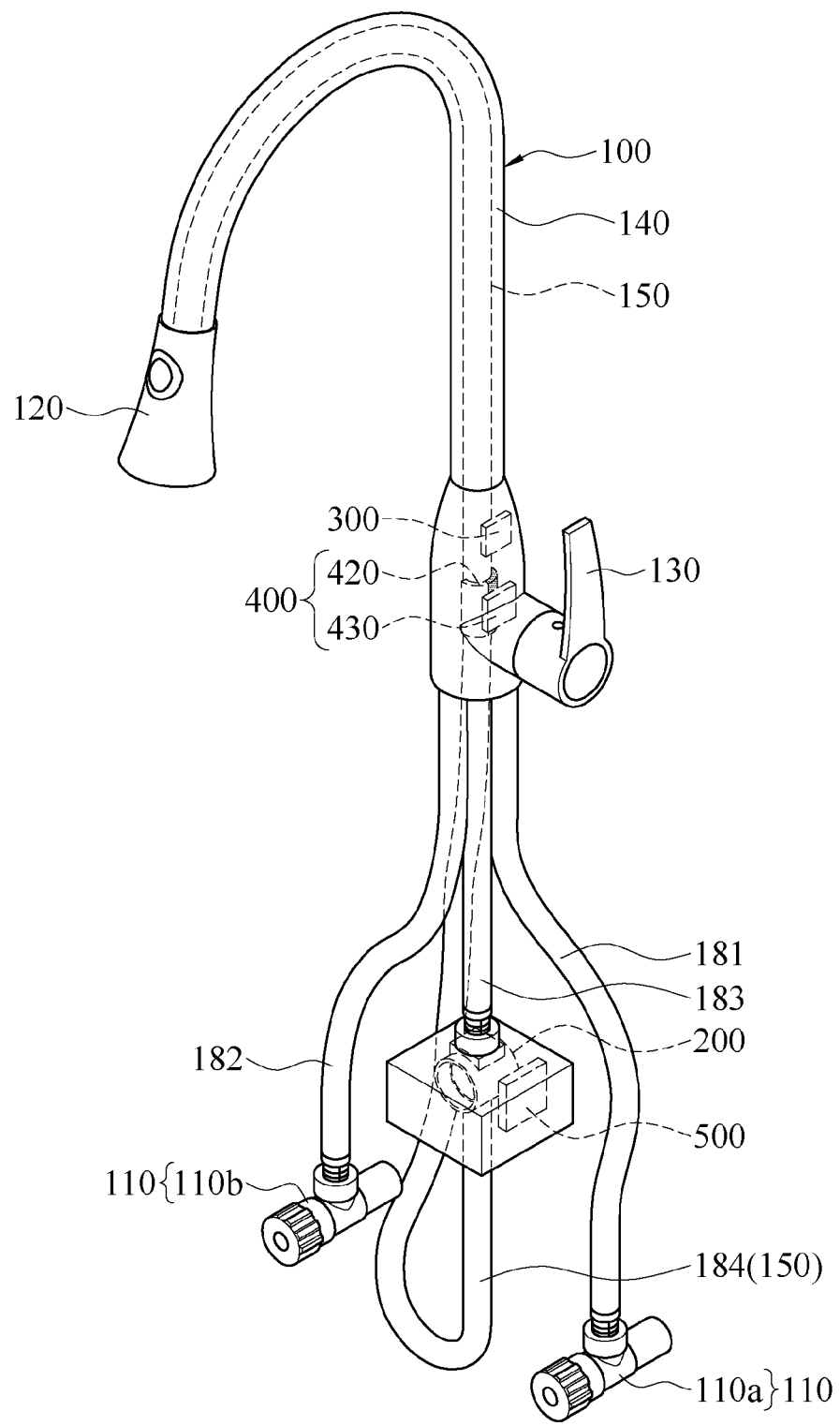

In some embodiments, as shown in FIG. 7, the motion sensing unit 400 includes a magnet 420 and a magnetoresistive element 430. Herein, the magnet 420 is the foregoing movable part and is disposed on a pulling water pipe 150. The magnetoresistive element 430 is fixed at a position in which magnetic field strength and a magnetic field direction of the magnet 420 can be sensed. When the magnet 420 changes a relative distance between the magnet 420 and the magnetoresistive element 430 because the pulling water pipe 150 is pulled or released, the magnetic field strength and direction that are sensed by the magnetoresistive element 430 change. When the magnet 420 rotates because the water outlet pipe 140 rotates, the magnetic field strength and direction sensed by the magnetoresistive element 430 changes, and changes of the magnetic field strength and direction when the water outlet pipe 140 rotates are different from those when the pulling water pipe 150 is pulled or released. Based on this, the rotation direction and angle of the water outlet pipe 140 and whether the pulling water pipe 150 is pulled or released may be detected.

In some embodiments, for a faucet having the pulling water pipe 150, the magnet 420 is disposed on the water outlet pipe 140.

Figure 8:
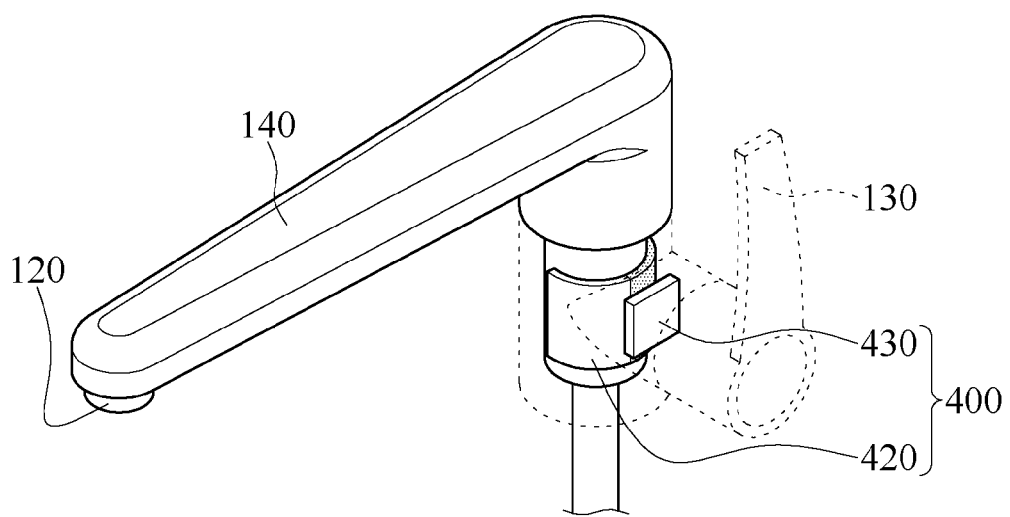

Referring to FIG. 8, in some embodiments, for a faucet that does not have a pulling water pipe 150, the magnet 420 is disposed on the water outlet pipe 140. Based on this, the rotation direction and angle of the water outlet pipe 140 may also be detected.

In some embodiments, the positions of the magnet 420 and the magnetoresistive element 430 may be interchanged.

Figure 9:
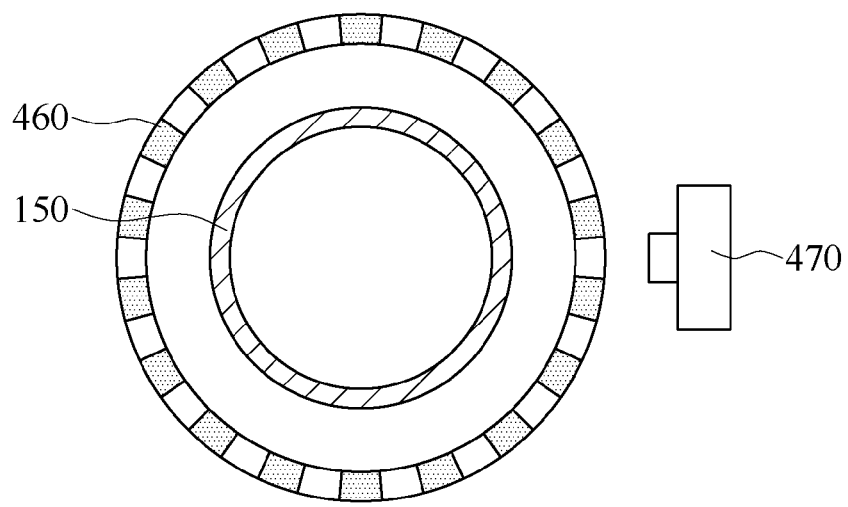

In some embodiments, as shown in FIG. 9, the motion sensing unit 400 may be an optical detector including a turntable 460 and an optical transceiver 470. Herein, the turntable 460 has a round shape. A side edge of the turntable 460 has a pattern that bright and dark stripes are interlaced, and is sleeved on the pulling water pipe 150. Therefore, the turntable 460 is the foregoing movable part. The optical transceiver 470 is located on one side of the turntable 460, and shines on the turntable 460 and detects reflected light. When the pulling water pipe rotates, the turntable 460 rotates, and the optical transceiver 470 detects reflected light with different luminance to respond with different output voltage values. The voltage detection circuit may detect the output voltage values, and determine, based on the output voltage values, whether the pulling water pipe 150 rotates because the water outlet pipe 140 rotates. In addition, when the pulling water pipe 150 is pulled, the turntable 460 is not opposite to the optical transceiver 470. In this case, the optical transceiver 470 detects reflected light different from that when the turntable 460 is opposite to the optical transceiver 470. Therefore, whether the pulling water pipe 150 is pulled or released may also be determined based on the change of the voltage value of the optical transceiver 470. In some embodiments, the optical transceiver 470 may only receive light instead of both emitting and receiving light.

Although the above descriptions are as examples in which the foregoing bright and dark stripes or north and south magnetic poles are in a plurality of quantity, this embodiment of the present invention is not limited thereto. In some embodiments, there is only a combination of a single bright stripe and a single dark stripe, or only a combination of a single north magnetic pole and a single south magnetic pole.

Figure 10:
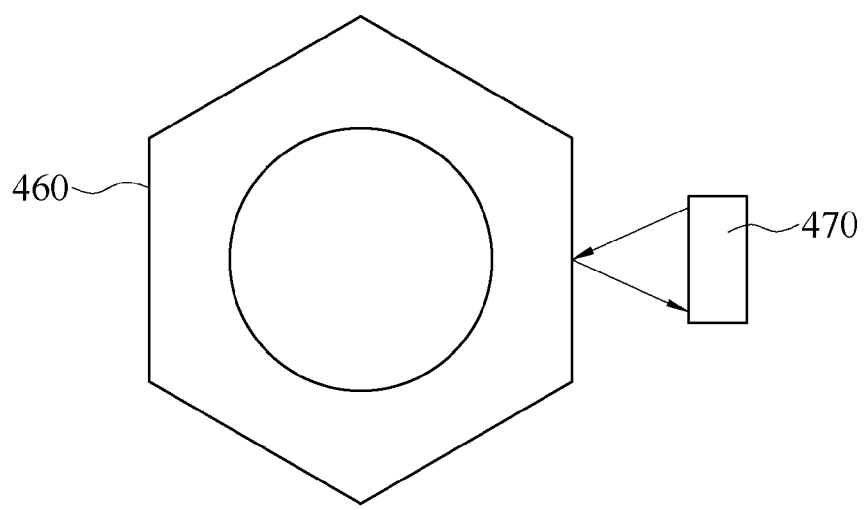
Figure 11:
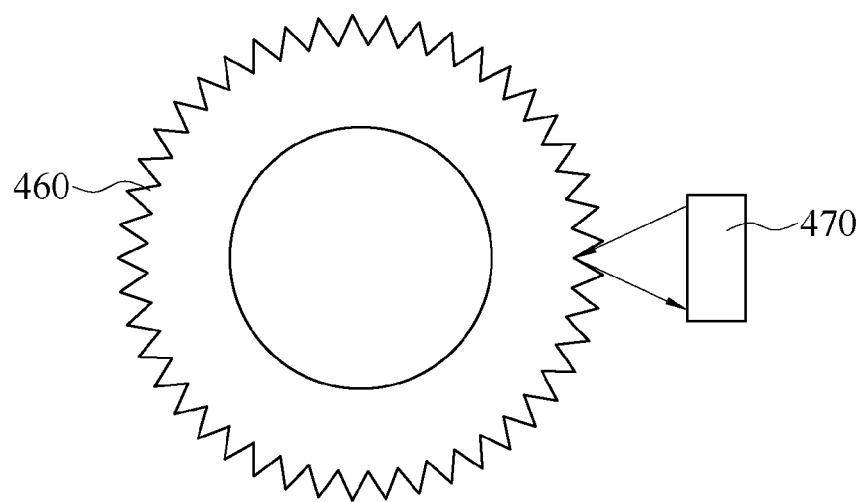

In some embodiments, the turntable 460 may has another shape, so that different incidence angles are generated when light arrives at different positions of the side edge of the turntable 460, to be reflected to different directions. Therefore, when the turntable 460 rotates, the optical transceiver 470 may detect a difference in light luminance or a reflection direction. As shown in FIG. 10, the turntable 460 may be a polygon, and therefore the foregoing patterns do not need to be formed on the side edge of the turntable 460. As shown in FIG. 11, the side edge of the turntable 460 may has a gear shape.

Figure 12:
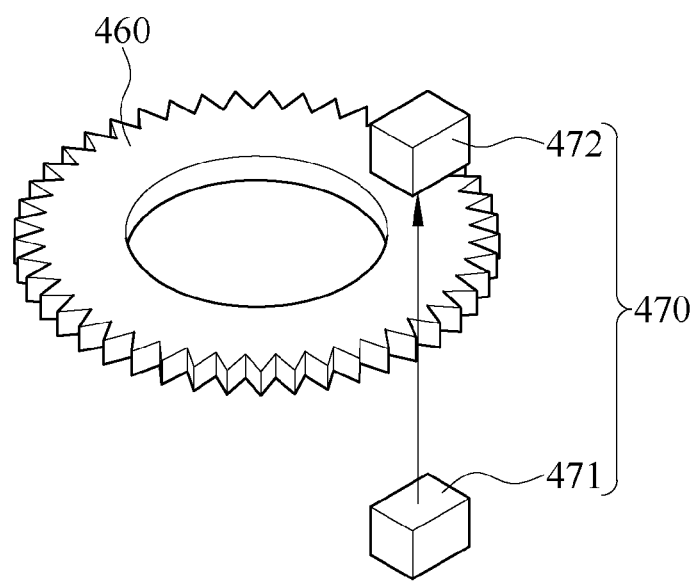

In some embodiments, as shown in FIG. 12, when the side edge of the turntable 460 is not flat, the optical transceiver 470 may not be disposed on the side end of the turntable 460, and a transmit end 471 and a receive end 472 of the optical transceiver 470 may be located on two sides of an edge of a plane of the turntable 460, so that when the turntable 460 rotates, light emitted from the transmit end 471 may be sometimes blocked by the turntable 460 or sometimes received by the receive end 472 through a vacancy of the turntable 460.

In some embodiments, the movable part of the motion sensing unit 400 may be one or more switches (for example, a mercury switch or a vibration switch). When a motion quantity of a specific direction reaches a specific value, a conduction status of the switch changes, to detect a change of motion or rotation of the specific direction.

In some embodiments, a pull-down outlet mode or a non-pull-down outlet mode may coexist with the touch mode or the manual mode. For example, in a state when the touch mode coexists with the pull-down outlet mode, the user may pull the pulling water pipe 150, to turn on the faucet. Then, the user may touch the faucet body 100 to turn off the faucet, and then release the pulling water pipe 150, so that water splashing around in a process of releasing the pulling water pipe 150 is prevented.

The pull-down outlet mode and the non-pull-down outlet mode may be switched based on the first signal and the second signal. When determining, based on the second signal, that the pulling water pipe 150 is in a pulled-out state, and detecting, by using the first signal, that a time period in which the faucet body 100 is contacted by an object exceeds a second time period, the control unit 500 changes the operation mode of the faucet from a current pull-down outlet mode to a non-pull-down outlet mode or from a current non-pull-down outlet mode to a pull-down outlet mode.

In some embodiments, the faucet body 100 may not have the foregoing manual control valve 130 and does not have the manual mode, and is operated in the touch mode. However, if the faucet body 100 has a pulling water pipe 150, the faucet body 100 may still have the foregoing pull-down outlet mode. In addition, if the water outlet pipe 140 may rotate, an action that the user pushes the water outlet pipe 140 may also be determined based on the first signal and the second signal.

In some embodiments, the faucet body 100 may not have the manual control valve 130 and the contact sensing unit 300, but have the motion sensing unit 400 to execute the foregoing pull-down outlet mode without having the manual mode and the touch mode.

In this specification, for ease of description, in comparisons of values such as length of time and motion quantity, a case in which the values are the same are not specifically described. However, persons having ordinary skill in the art should understand that if the values are the same, either a processing manner in which a value is greater than a threshold or a processing manner in which a value is less than a threshold may be performed, and one of the two may be selected to be performed.

The foregoing first threshold, second threshold, and third threshold may be specific values, but in some cases those are used to distinguish between cases of zero and non-zero. The first threshold is used as an example for description. Being greater than the first threshold refers to a case in which the first horizontal motion quantity is non-zero, and being less than the first threshold refers to a case in which the first horizontal motion quantity is zero.

In some embodiments, the power module 700 includes two power supply units (referred to as a first power supply unit 710 and a second power supply unit 720 hereinafter), and one of the two is selected to supply power. For example, when the first power supply unit 710 cannot supply power normally, the second power supply unit 720 supplies power. The power supply unit may supply power by converting an external source or by providing a source of the power supply unit, and may be, for example, a power supplier, a voltage regulator, a solar panel, a port, a battery, a capacitor, a piezoelectric switch, or a generator.

In some embodiments, the second power supply unit 720 may provide power to only some elements. For example, the second power supply unit 720 only provides power to the electrically controllable valve 200, so that the faucet may maintain a most basic function of being turned on or turned off.

Figure 13:
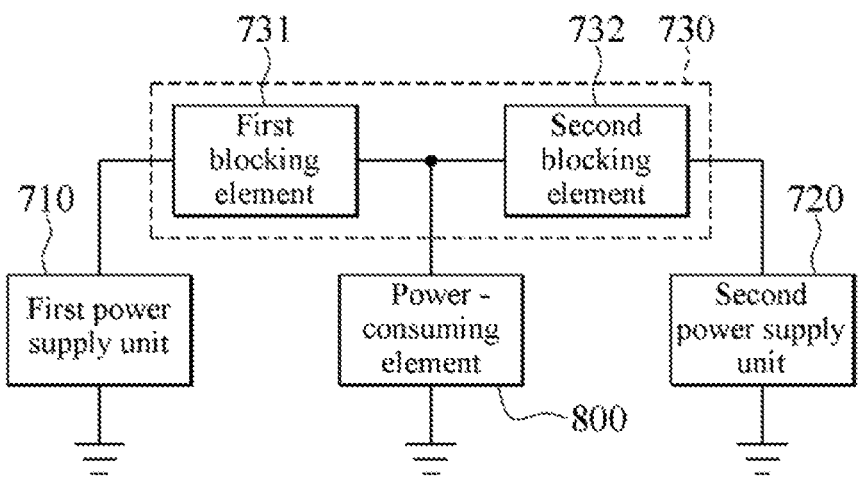
FIG. 13 is a schematic diagram of a power module according to an embodiment of the present invention.

FIG. 13 shows an embodiment of a power module 700 having two power supply units. Two power supply units 710 and 720 are connected in parallel to the power-consuming element 800. The power module 700 further includes a switching unit 730 electrically connected between the two power supply units 710 and 720, to be switched between the two power supply units 710 and 720 to supply power by one of the two supply units 710 and 720. The switching unit 730 includes at least one blocking element. There are two blocking elements used as an example herein. A first blocking element 731 is coupled between the power-consuming element 800 and the first power supply unit 710, and a second blocking element 732 is coupled between the power-consuming element 800 and the second power supply unit 720. Herein, the blocking element may be, for example, an open-circuit/short-circuit control element such as a transistor, a multiplexer, or a switch, to control conduction between the power-consuming element 800 and the power supply units 710 or 720. Generally, the first blocking element 731 is in a short-circuit state and the second blocking element 732 is in an open-circuit state, so that the first power supply unit 710 and the power-consuming element 800 are conducted, and the second power supply unit 720 and the power-consuming element 800 are not conducted. In this case, the power-consuming element 800 is powered by only the first power supply unit 710. When the first power supply unit 710 cannot be able or powerful to supply the power-consuming element 800 with power, the first blocking element 731 switches to the open-circuit state and the second blocking element 732 switches to the short-circuit state, so that the second power supply unit 720 and the power-consuming element 800 are conducted. Therefore, the power-consuming element 800 may be powered by the second power supply unit 720 to keep operating normally.

In some embodiments, the first blocking element 731 shown in FIG. 13 may be omitted.

Figure 14:
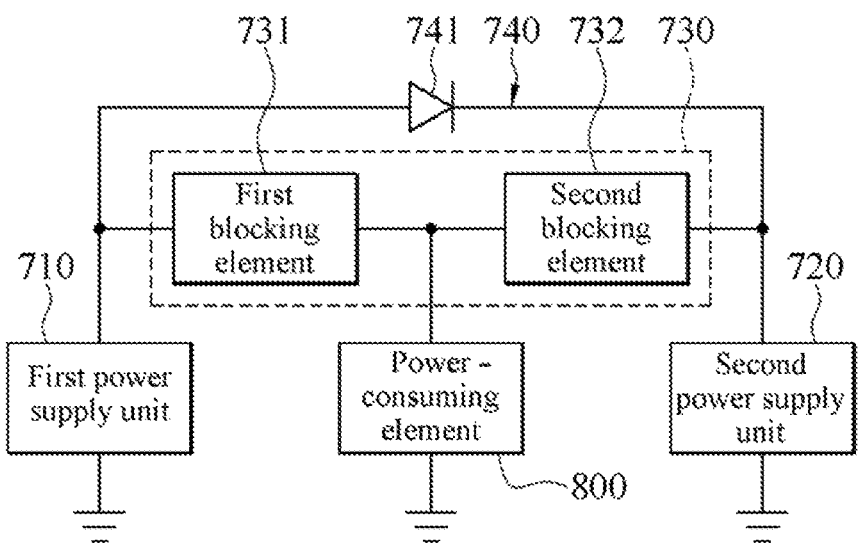
FIG. 14 is a schematic diagram of a power module according to another embodiment of the present invention.

FIG. 14 is a schematic diagram of another embodiment of the power module 700. Compared with FIG. 13, the power module 700 further includes a charge loop 740 connected between the two power supply units 710 and 720, so that one of the two power supply units 710 and 720 charges the other of the two power supply units 710 and 720. Herein, the charge loop 740 includes a diode 741, to limit a current flow direction, so that the second power supply unit 720 does not generate a current into the first power supply unit 710, and the first power supply unit 710 charges the second power supply unit 720. However, this embodiment of the present invention is not limited thereto. In some embodiments, a direction of the diode 741 may be opposite to the direction shown in FIG. 14, so that the second power supply unit 720 charges the first power supply unit 710. Herein, the first power supply unit 710 or the second power supply unit 720 that is charged may be a rechargeable device such as a rechargeable battery or a capacitor.

In some embodiments, following the example in FIG. 14, the first power supply unit 710 and the second power supply unit 720 are detachable. When the first power supply unit 710 cannot be able or powerful to supply the power-consuming element 800 with power, the user may replace the first power supply unit 710 with the second power supply unit 720, so that the second power supply unit 720 supplies the power-consuming element 800 with power. Based on this, the first blocking element 731 and the second blocking element 732 may be omitted.

In some embodiments, as shown in FIG. 2, the faucet may further include an indication unit 600 that is an audio indication unit herein and is electrically connected to the control unit 500. The audio indication unit may play voice based on a current operation mode and/or a water flow state, for the user to identify the current operation mode and/or the water flow state of the faucet. Herein, the voice played may be a speech sound or a specific sound effect, for the user to make a distinction.

In some embodiments, the indication unit 600 may be a visual indication unit and may emit light based on the current operation mode and/or the water flow state, for the user to identify the current operation mode and/or the water flow state of the faucet. Herein, the emitted light may have a specific color or/and a pattern, for the user to make a distinction.

In some embodiments, the indication unit 600 is electrically connected to the power module 700, and may output a signal based on a power supply state of the power module 700, to indicate the power supply state (for example, whether there is electricity or whether an electric quantity or a supplied voltage is normal) of the power module 700. In some embodiments, the power supply state may be a power supply state of a single power supply unit.

In some embodiments, a foregoing result of detecting the rotation of the water outlet pipe 140 may be used as an input signal. That is, the user may use the water outlet pipe 140 as an input interface by rotating the water outlet pipe 140, for example, adjusting strength of the indication signal of the indication unit 600, or adjusting a volume of cold water, a volume of hot water or a volume ratio of cold water to hot water of the electrically controllable valve 200.

In some embodiments, in a set state, the control unit 500 may get a rotation status of the water outlet pipe 140 based on a signal of the motion sensing unit 400, and may adjust the strength of the indication signal of the indication unit 600 based on the rotation status (for example, a rotation direction and a rotation angle). The adjusting the strength of the indication signal may be, for example, increasing/reducing light luminance or increasing/reducing an audio volume. For example, when the water outlet pipe 140 rotates counterclockwise, the signal strength is increased, or when the water outlet pipe 140 rotates clockwise, the signal strength is reduced. In some embodiments, the case may be contrary. In some embodiments, the rotation angle may represent an increased or decreased quantity of the signal strength.

In some embodiments, a changed quantity of the indication signal strength may be inputted in another manner. For example, a touch action of the user may be got through a signal of the contact sensing unit 300, and the quantity of the indication signal strength change may be represented by a specific quantity of times of the touch actions or a time period in which the touch action lasts.

In some embodiments, entering or exiting the set state may be triggered by using a signal of the contact sensing unit 300. That is, the control unit 500 determines, based on the signal output from the contact sensing unit 300, whether a preset condition is met, and if the preset condition is met, the control unit 500 switches between the set state and a non-set state. The preset condition may be, for example, a specific quantity of touch actions performed by the user or a specific time period in which the touch action lasts.

In some embodiments, entering or exiting the set state may be triggered by using a signal of the motion sensing unit 400. That is, the control unit 500 determines, based on the signal output from the motion sensing unit 400, whether a preset condition is met, and if the preset condition is met, the control unit 500 switches between the set state and the non-set state. The preset condition may be, for example, a specific quantity of times for which the pulling water pipe 150 is pulled or released in a period of time. In some embodiments, the preset condition may be a specific quantity of times, a direction, or a frequency of the rotation of the water outlet pipe 140.

In some embodiments, the preset condition triggering whether entering or exiting the set state may be a combination of at least two of the rotation of the water outlet pipe 140, the user touch action detected by using the contact sensing unit 300, and the action that the pulling water pipe 150 is pulled or released. In some embodiments, the combinations in the preset condition need to occur at the same time. In some embodiments, the combinations in the preset condition occur in a time-sequential manner.

Figure 15:
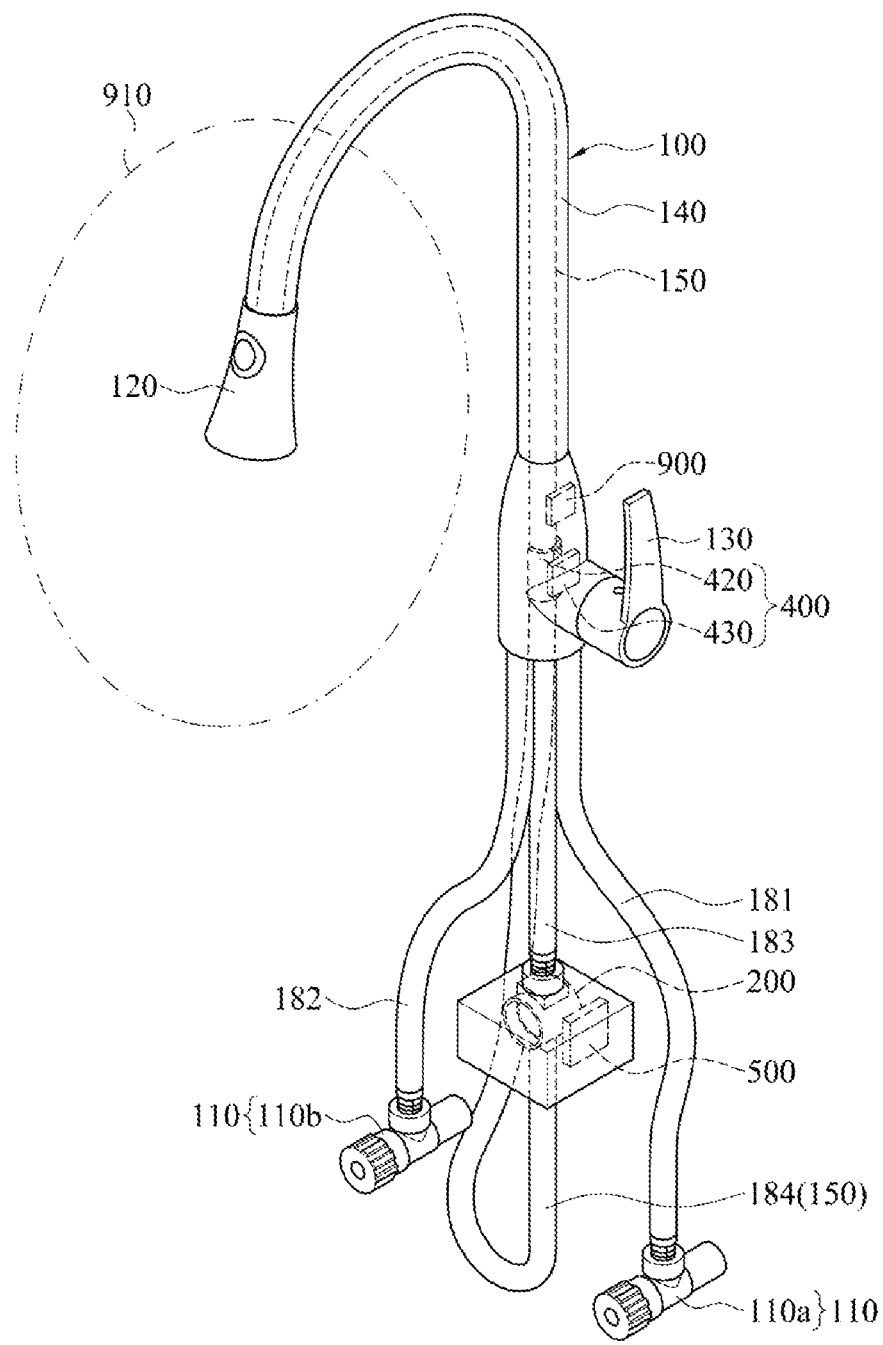
FIG. 15 is a schematic three-dimensional diagram of a faucet according to still another embodiment of the present invention.

Referring to FIG. 15, which is a schematic three-dimensional diagram of a faucet according to still another embodiment of the present invention. The faucet includes a faucet body 100, an electrically controllable valve 200, a proximity sensing unit 900, a motion sensing unit 400 and a control unit 500. The control unit 500 is electrically connected to (for example, electrically connected to by using a conductive wire) the electrically controllable valve 200, the proximity sensing unit 900, and the motion sensing unit 400. The proximity sensing unit 900 has a detection zone 910 outside the faucet body 100 to respond a change of a third signal based on whether an object enters the detection zone 910. The faucet body 100 includes a water inlet end 110 and a water outlet end 120. The electrically controllable valve 200 is connected between the water inlet end 110 and the water outlet end 120, to allow or block the connection between the water inlet end 110 and the water outlet end 120 based on an on-off state of the electrically controllable valve 200. The control unit 500 decides the electrically controllable valve 200 to be turned from the off state to the on state or from the on state to the off state depending on the change of the third signal. The proximity sensing unit 900 may be a non-contact capacitance sensing unit, an ultrasonic sensing unit, or an infrared sensing unit.

Figure 16:
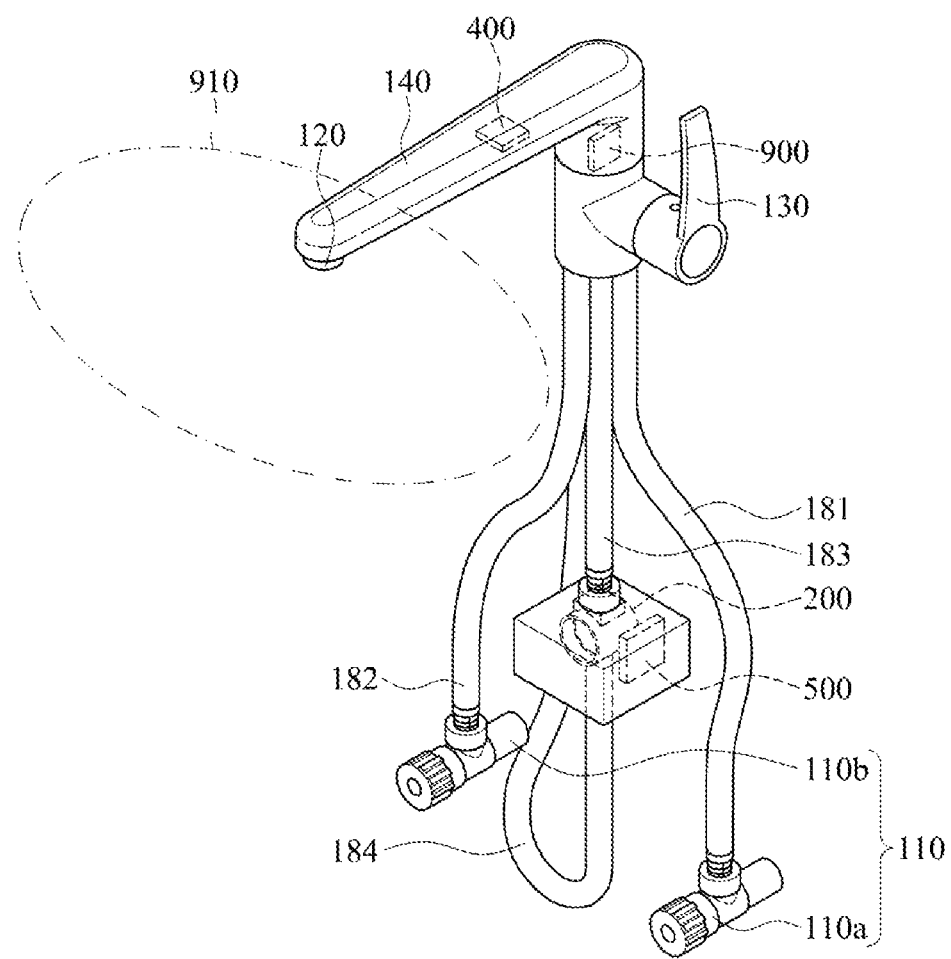
FIG. 16 is a schematic three-dimensional diagram of a faucet according to further another embodiment of the present invention.

In some embodiments, the water outlet pipe 140 is rotatable, as shown in FIG. 16. The motion sensing unit 400 may be disposed on the water outlet pipe 140. The user pushes the water outlet pipe 140 and the water outlet end 120 can rotate relative to an axial center, to change a water flow position. However, when the user pushes the water outlet pipe 140, usually, the user also enters the detection zone 910 of the proximity sensing unit 900, as a result, the control unit 500 may perform an erroneous determining to perform the foregoing action of turning on or turning off the faucet. Therefore, the motion sensing unit 400 may be used to help determine whether the action of entering the detection zone 910 indicates that the user wants to push the water outlet pipe 140. A specific detection manner is that the first horizontal motion quantity of the water outlet pipe 140 may be obtained by using the second signal output from the motion sensing unit 400. When the control unit 500 detects that an object enters the detection zone 910 of the proximity sensing unit 900 (that is, the third signal changes from another first level to another second level) and the first horizontal motion quantity is less than the first threshold, it is determined that the user intends to turn on or turn off the faucet through entering the detection zone 910, and therefore the on-off state of the electrically controllable valve 200 changes. When the control unit 500 detects that an object enters the detection zone 910 of the proximity sensing unit 900 (that is, the third signal changes from another first level to another second level) and the first horizontal motion amount is greater than a first threshold, it is determined that the user intends to push the water outlet pipe 140 instead of turning on or turning off the faucet, and therefore the on-off state of the electrically controllable valve 200 does not change.

Referring to FIG. 15, in some embodiments, when the water outlet pipe 140 rotates, the motion sensing unit 400 disposed on the pulling water pipe 150 also rotates, and therefore the second horizontal motion quantity of the pulling water pipe 150 may be detected, and it may be determined whether the second horizontal motion quantity is greater than the third threshold. Herein, based on the position on the pulling water pipe 150 at which the motion sensing unit 400 is disposed, third thresholds of different values may be set. That is, when detecting that the object enters the detection zone 910 and the second horizontal motion quantity is less than the third threshold, the control unit 500 changes the on-off state of the electrically controllable valve 200, or when detecting that the object enters the detection zone 910 and the second horizontal motion quantity is greater than the third threshold, the control unit 500 does not change the on-off state of the electrically controllable valve 200. By the way, in this example, if the control unit 500 does not detect that the object enters the detection zone 910, the control unit 500 does not change the on-off state of the electrically controllable valve 200.

The control unit 500 may control an operation mode of the faucet based on the third signal. Herein, the operation mode may be the manual mode or a proximity-sensing mode. The manual mode is used by the user to operate the manual control valve 130, and when the manual control valve 130 is turned on, the faucet is turned on, and when the manual control valve 130 is turned off, the faucet is turned off. The proximity-sensing mode is used by the user to determine, based on an action of that an object enters the detection zone 910, whether to turn on or turn off the faucet. When the control unit 500 detects that a time period in which the third signal changes from another first level to another second level and keeps in the second level longer than a third time period, it indicates that an object enters the detection zone 910 for a period of time, and it indicates that the user intends to change the operation mode of the faucet. Therefore, the control unit 500 changes the operation mode of the faucet from the current manual mode to the proximity-sensing mode or from the current proximity-sensing mode to the manual mode.

Referring to FIG. 15, in some embodiments, the motion sensing unit 400 is disposed on the pulling water pipe 150, and a vertical motion quantity of the pulling water pipe 150 may be detected. Herein, a motion quantity is described by using a displacement as an example, and it may be set that when the pulling water pipe 150 is not pulled out, the vertical motion quantity is an initial value, and the initial value may be, for example, zero. When detecting that the vertical motion quantity is greater than a second threshold, the control unit 500 determines that the pulling water pipe 150 is in a pulled-out state, and further turns on the electrically controllable valve 200, so that the faucet is turned on. On the contrary, when detecting that the vertical motion quantity is less than another second threshold, the control unit 500 determines that the pulling water pipe 150 is in a released state, and further turns off the electrically controllable valve 200, so that the faucet is turned off. Herein, the two second threshold may be either the same or different. Therefore, the user may directly use the faucet by pulling or releasing the pulling water pipe 150 instead of turning on the faucet in the manual mode or the proximity-sensing mode. This is herein referred to as a pull-down outlet mode. However, the faucet having the pulling water pipe 150 is not limited to must have a pull-down outlet mode in this embodiment of the present invention. The faucet having the pulling water pipe 150 may still be turned on or turned off in the manual mode or the proximity-sensing mode (herein referred to as a non-pull-down outlet mode).

The pull-down outlet mode and the non-pull-down outlet mode may be switched based on the second signal and the third signal. When determining, based on the second signal, that the pulling water pipe 150 is in a pulled-out state, and detecting, by using the third signal, that a time period in which an object lasts to be in the detection zone 910 exceeds a fourth time period, the control unit 500 changes the operation mode of the faucet from a current pull-down outlet mode to a non-pull-down outlet mode or from a current non-pull-down outlet mode to a pull-down outlet mode.

In some embodiments, the faucet body 100 may not have the foregoing manual control valve 130 and does not have the manual mode, and is operated in the proximity-sensing mode. However, if the faucet body 100 has a pulling water pipe 150, the faucet body 100 may still have the foregoing pull-down outlet mode. In addition, if the water outlet pipe 140 may rotate, an action that the user pushes the water outlet pipe 140 may also be determined based on the first signal and the third signal.

In conclusion, a contact sensing unit or a proximity sensing unit, and a motion sensing unit may be installed on a faucet in an embodiment of the present invention, so that the faucet, based on a detected signal of the faucet, executes a plurality of operation modes or switches between a plurality of operation modes. In addition, a faucet in an embodiment of the present invention may be used as an input interface of a set signal. Furthermore, a power module of a faucet in an embodiment of the present invention has a plurality of power supply units, so that it can be ensured that the faucet is normally operated. Moreover, a faucet in an embodiment of the present invention further has an indication unit that may be used by a user to identify a status of the faucet.

What is claimed is:

1. A faucet, comprising:
   a faucet body, comprising a water inlet end, a water outlet end, and a rotatable water outlet pipe;
   an electrically controllable valve, connected between the water inlet end and the water outlet end, to allow or block connection between the water inlet end and the water outlet end based on an on-off state of the electrically controllable valve;
   a motion sensing unit, comprising a movable part, wherein the movable part is disposed on the faucet body, to respond, based on a rotation status of the rotatable water outlet pipe, a change of a signal output from the motion sensing unit; and
   a control unit, electrically connected to the motion sensing unit and the electrically controllable valve, to get the rotation status of the rotatable water outlet pipe based on the signal output from the motion sensing unit;
   wherein the control unit adjusts a volume ratio of cold water to hot water of the electrically controllable valve based on the rotation status of the rotatable water outlet pipe.

2. The faucet according to claim 1, further comprising an indication unit electrically connected to the control unit, wherein the control unit determines, based on the rotation status of the rotatable water outlet pipe, whether a preset condition is met, and if the preset condition is met, the control unit enters or exits a set state, the control unit adjusts a turn-on strength of an indication signal of the indication unit based on the rotation status of the rotatable water outlet pipe in the set state.

3. The faucet according to claim 1, further comprising:
   an indication unit electrically connected to the control unit; and
   a contact sensing unit comprising a sensing end, wherein the sensing end is disposed on or electrically connected to the faucet body, to respond, based on whether the faucet body is contacted by an object, a change of a signal output from the contact sensing unit, and the control unit determines, based on the signal output from the contact sensing unit, whether a preset condition is met, and if the preset condition is met, the control unit enters or exits a set state,
   wherein the control unit adjusts a turned-on strength of an indication signal of the indication unit based on a change of the signal output from the contact sensing unit in the set state.

4. The faucet according to claim 1, wherein the faucet body further comprises a pulling water pipe that can be pulled out from the faucet body, the movable part of the motion sensing unit is disposed on the pulling water pipe, to respond, based on a vertical motion quantity of the pulling water pipe, a change of a signal output from the motion sensing unit, and the control unit determines, based on the signal output from the motion sensing unit, whether a preset condition is met, and if the preset condition is met, the control unit enters or exits a set state, wherein, in the set state, the control unit adjusts a turn-on strength of an indication signal of an indication unit or the volume ratio of cold water to hot water of the electrically controllable valve.

* * * * *